Feb. 16, 1960   R. A. SHAHBENDER   2,925,564
APPARATUS FOR MODULATING AN IONIZED MEDIUM
Filed Jan. 18, 1956
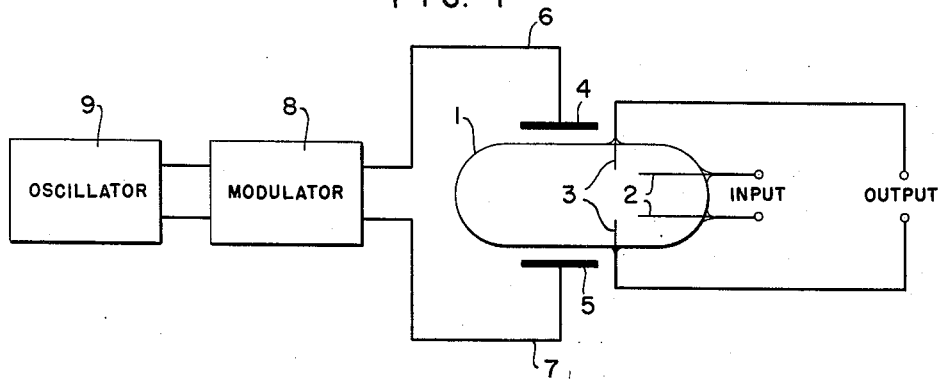
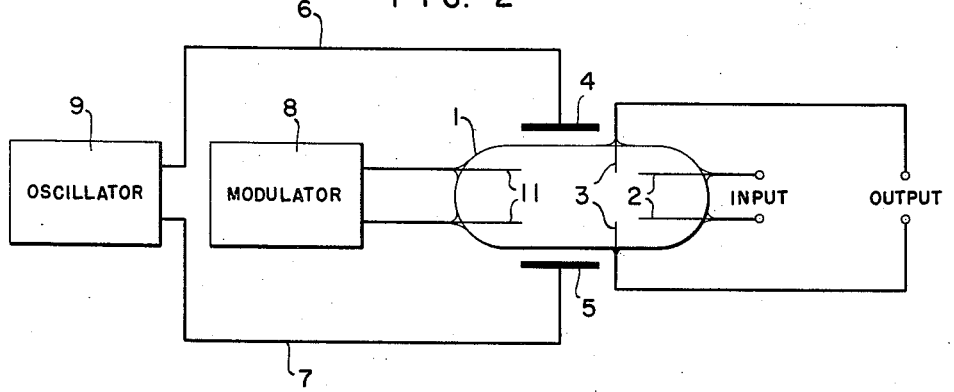
*INVENTOR.*
RABAH A. SHAHBENDER
BY
ATTORNEY.

United States Patent Office 2,925,564
Patented Feb. 16, 1960

2,925,564

APPARATUS FOR MODULATING AN IONIZED MEDIUM

Rabah A. Shahbender, Westmont, N.J., assignor to Minneapolis-Honeywell Regulator Company, Minneapolis, Minn., a corporation of Delaware Application January 18, 1956, Serial No. 559,962

2 Claims. (Cl. 332—57)

A general object of the present invention is to provide a new and improved electrical modulating means. More specifically, the present invention is concerned with a modulator particularly adapted to converting a direct current signal into an alternating current signal.

It is known in the art, that, when a gas filled tube having two internal electrodes is placed within a high frequency field of such an intensity as to cause the ionization of the gas within the tube, a direct current voltage may be developed between the electrodes. The magnitude and polarity of this voltage is dependent upon the asymmetry of the distribution of the ionization with respect to the electrodes.

It is a specific object of the present invention to employ this phenomena to provide a new and improved signal modulating device.

Another object of the present invention is to provide a new and improved modulator which will operate over an extremely large and easily adjustable frequency range.

Still another object of the present invention is to provide a modulator in which there is a negligible phase shift between the modulating signal and the modulated output signal.

A further object of the present invention is to provide a modulator which is capable of amplifying as well as modulating the input signal.

The various objects of the present invention are achieved by positioning within a modulated high frequency electric field an envelope, filled with a medium capable of being ionized by the field, in which there are sealed a pair of input electrodes and a pair of output electrodes. The signal to be modulated is applied to the input electrodes, causing dissymmetry in the distribution of the ionized field with respect to the output electrodes. This dissymmetry causes potential gradients to exist between these electrodes. Due to the modulation of the high frequency field and the resulting modulation of the ionization within the envelope, the voltage produced between the output electrodes by these gradients is modulated at the frequency employed to modulate the high frequency field.

The various features of novelty which characterize this invention are pointed out with particularity in the claims annexed to and forming part of this specification. For a better understanding of the invention, its advantages, and the specific objects attained with its use, reference should be had to the accompanying drawing and descriptive matter in which are illustrated and described preferred embodiments of this invention.

Of the drawings:

Fig. 1 is a circuit diagram of a preferred embodiment of the present invention; and Fig. 2 is a modification of the embodiment of the present invention as shown in Fig. 1.

Referring now to Fig. 1, there is designated by the numeral 1, a gas filled envelope in which there are sealed a pair of input electrodes 2 and a pair of output electrodes 3. The envelope 1 may be made of glass or any other suitable material capable of being permeated by high frequency electric waves. The envelope 1 may be filled with any desirable dielectric material capable of being ionized by a high frequency field of a reasonable magnitude and frequency. By way of example, the gaseous medium within the envelope 1 may be helium, neon, hydrogen, argon, or mercury vapor to mention a few. As will be explained in more detail hereinafter, the pressure of the gas within the envelope 1 may vary over a considerable range, but it will be assumed that the pressure employed will be such as to permit the system to operate in a manner to be described.

While the input electrodes 2 and the output electrodes 3 have been shown in the form of straight wires, it should be understood that under certain conditions of operation it may be desirable to employ electrodes of other shapes or geometric configurations. In addition, it may also be desirable to position the input electrodes 2 and the output electrodes 3, with respect to each other and with respect to the envelope 1, in a manner other than that shown.

The envelope 1 is positioned between an electrode 4 and an electrode 5 which are connected by means of conductors 6 and 7 respectively to the output of a moduator 8 which is operative to modulate the output of a source of high frequency alternating current, shown here as an oscillator 9. The electrodes 4 and 5 are operative to subject the gaseous medium within the envelope 1 to the high frequency alternating field produced by the oscillator 9. The output of the oscillator 9 is preferably a radio frequency signal although oscillations in the audio, video, or ultra high frequency ranges may also be employed. The output of the oscillator 9 must be sufficient to cause ionization of the gaseous medium within the envelope 1. Since a much smaller voltage is required to ionize a gas at radio or higher frequencies than at lower frequencies, outputs in these higher frequency spectrums are particularly useful.

The modulator 8 may be any type of modulator capable of modulating the output of the oscillator 9. It is desirable, however, that the modulator be capable of providing modulation over a wide frequency band extending down into the low audio frequencies. It is further desirable that the degree of modulation superimposed on the output of the oscillator 9 by the modulator 8 also be adjustable. As will be explained hereinafter, the mode of operation of the embodiment of the present invention shown in Fig. 1 is in part determined by the degree of modulation superimposed by the modulator 8 on the output of the oscillator 9.

While the high frequency oscillations produced by the oscillator 9 have been shown being impressed upon the gaseous medium within the envelope 1 by means of the external electrodes 4 and 5, it is within the scope of the present invention that other means be employed to subject the medium to the ionizing electric field. By way of example, the electrodes 4 and 5 may be sealed within the envelope 1, or the field may be impressed upon the medium by means of a coil surrounding the envelope 1.

In considering the operation of the embodiment of the present invention shown in Fig. 1, the effect of the modulation, superimposed on the output of the oscillator 9 by the modulator 8, will be disregarded for the moment. When the gas within the envelope 1 is ionized by means of the high frequency field impressed thereon by the electrodes 4 and 5, any asymmetry of the distribution of the ionization with respect to the output electrodes 3 will cause a direct current to be developed between the three electrodes having a magnitude and polarity dependent upon this asymmetry. If the output electrodes 3 are symmetrically disposed with respect to the ionized medium within the envelope 1, no voltage will be developed between the electrodes 3. The output electrodes 3 are sealed within the envelope 1 in such a manner that this symmetry exists. Upon the application of a voltage to the input electrodes 2, however, this symmetry is destroyed by the attraction of the positively charged ions toward the negative input electrode. The resulting dissymmetry of the ionization within the envelope 1 with respect to the output electrodes 3 will cause a D.C. voltage to be produced between the output electrodes 3 having a magnitude and polarity dependent upon the magnitude and direction of this dissymmetry. Over certain ranges of oscillator voltage and envelope gas voltage, the voltage thus produced across the output electrodes 3 will be substantially independent of both the frequency and the magnitude of the oscillator voltage. Under such conditions, the effect of the modulation superimposed upon the oscillator output by the modulator 8 would not appear in the output circuit. Under these conditions, a D.C. voltage applied to the input electrodes 2 would produce a D.C. voltage at the output electrodes 3. If, on the other hand, the embodiment of the present invention shown in Fig. 1 is operated over other voltage and pressure ranges, increases and decreases in oscillator output voltage produce increases and decreases in the voltage developed across the output electrodes 3. For the purposes of the present invention, it is assumed that the apparatus of Fig. 1 is operated under such conditions that the modulation envelope superimposed on the output of the oscillator 9 by the modulator 8 will be reproduced in the output circuit. Thus, the voltage developed across the output electrode 3 may be considered as a superposition of a direct current voltage dependent upon the magnitude and polarity of the voltage applied to the input electrodes 2 and alternating current voltage dependent upon the modulating signal.

The mode of operation of the present invention is determined to a certain extent by the degree of modulation superimposed upon the output of the oscillator. If the degree of modulation is sufficient, the gaseous medium within the envelope 1 may be deionized for part of the modulation cycle. This mode of modulation is satisfactory for lower modulation frequencies. As the modulation frequency is increased however this mode of operation becomes unsatisfactory due to the finite recombination time of the molecules comprising the gaseous medium. Accordingly, at higher modulation frequencies it is desirable that the degree of modulation be such as to cause, with respect to the output electrodes 3, dissymmetries in the ionization of the gaseous medium at the modulation frequency.

Referring now to Fig. 2, there is shown a modification of the present invention as shown in Fig. 1. This modification comprises the introduction of the modulating signal directly into the gaseous medium within the envelope 1 by means of a pair of modulation electrodes 11 sealed within the envelope 1. As shown, the output of the modulator 8 is applied to the electrodes 11. The output of the oscillator 9 is connected directly to the external electrodes 4 and 5 by means of the conductors 6 and 7. The principle of operation of the circuit of Fig. 2 is identical to the principle of operation of the circuit of Fig. 1. The modulating voltage applied to the ionized field created within the gaseous medium by the output of the oscillator 9 causes dissymmetry of the ionization with respect to the output electrodes 3. This dissymmetry will modulate the direct current voltage produced across the output electrodes 3 by an input voltage applied to the input electrodes 2.

The present invention provides a modulator capable of converting a D.C. voltage into an A.C. voltage having the frequency which can be varied over a wide range by simply changing the frequency of the signal used to control the modulator 8. This avoids the complications of mechanical converters having restricted frequency ranges and structural resonant frequency limitations. In addition, by a proper selection of the pressure of the gaseous medium within the envelope 1, geometry of the envelope, and the oscillator voltage, signal amplification can be realized. Thus, a relatively small change in the input voltage applied to the electrodes 2 can be made to result in a much larger voltage being developed across the output electrode 3. It also should be noted that under certain conditions it may be desirable to modulate about an axis other than zero as has been described. In such a case, the quiescent operating point may be achieved in a number of ways, for example, by geometric asymmetry, electrode impedance dissimilarities or any combination of operating conditions which produce an output signal in the absence of an input signal.

While, in accordance with the provisions of the statutes, there have been illustrated and described the best forms of the embodiments of the present invention now known, it will be apparent to those skilled in the art that changes may be made in the forms of the apparatus disclosed without departing from the spirit of the invention as set forth in the appended claims and that in some instances certain features of the invention may be used to advantage without a corresponding use of other features.

Having now described this invention, what is claimed as new and for which it is desired to secure by Letters Patent is:

1. In combination, an oscillator for producing between a pair of electrodes a high frequency electric field, means connected thereto to modulate said field, an envelope filled with an ionizable medium positioned between said electrodes, a pair of input electrodes sealed within said envelope and adapted to receive an electric signal, and a pair of output electrodes sealed within said envelope.

2. An electrical switching means comprising in combination an envelope filled with a medium capable of being ionized by a high frequency field, said envelope being provided with a pair of input electrodes and a pair of output electrodes, and a third pair of electrodes energized with a modulated high frequency field, said envelope being disposed between said third pair of electrodes.

References Cited in the file of this patent

UNITED STATES PATENTS

| | | |
|---|---|---|
| 1,554,345 | Habann | Sept. 22, 1925 |
| 1,898,486 | Hund | Feb. 21, 1933 |
| 2,602,914 | Schlesman | July 8, 1952 |
| 2,696,584 | Lion | Dec. 7, 1954 |
| 2,750,455 | Geisler | June 12, 1956 |
| 2,800,622 | Lion | July 23, 1957 |

FOREIGN PATENTS

| | | |
|---|---|---|
| 280,948 | Great Britain | Feb. 18, 1929 |